United States Patent [19]

Farcy et al.

[11] 3,740,662
[45] June 19, 1973

[54] LASER DISCHARGE TUBE

[75] Inventors: Jean-Claude Farcy, Saint-Michel-sur-Orge; Roger Dumanchin, Orsay; Jean Rocca-Serra, Paris, all of France

[73] Assignee: Compagnie Generale D'Electricite, Paris, France

[22] Filed: Mar. 17, 1971

[21] Appl. No.: 125,037

[30] Foreign Application Priority Data
Mar. 23, 1970 France..........................331/94.5
Great Britain..................331/94.5

[52] U.S. Cl. ............... 331/94.5, 330/4.3, 313/309, 313/336, 313/351
[51] Int. Cl. ........ H01s 3/09, H01s 3/02, H01s 3/22
[58] Field of Search ................... 331/94.5; 330/4.3; 313/309 X, 336, 351

[56] References Cited
UNITED STATES PATENTS
3,294,971  12/1966  Von Der Heide .............. 313/309 X
3,321,714  5/1967   Den .................................. 331/94.5
3,402,313  9/1968   Gabor et al. ......................... 313/309

FOREIGN PATENTS OR APPLICATIONS
1,373,672  8/1964  France....................... 331/94.5
1,017,248  1/1966  Great Britain................. 331/94.5

Primary Examiner—Ronald L. Wibert
Assistant Examiner—R. J. Webster
Attorney—Sughrue, Rothwell, Mion, Zinn & Macpeak

[57] ABSTRACT

Disclosed are devices for causing electrical discharges in gases. The devices are characterized by the fact that the cathode includes sharp edged protuberances.

18 Claims, 8 Drawing Figures

PATENTED JUN 19 1973

LASER DISCHARGE TUBE

BACKGROUND OF THE INVENTION

This invention relates to gas laser discharge tubes in which the active gaseous medium is at a relatively high pressure. The gas pressure may be equal to or greater than atmospheric pressure.

It is known that if a metallic piece with a "pointed" end, that is, an end whose surface has a radius of curvature that is as close to zero as possible is brought to high electric potential there will be a contraction of the electric field force lines within the vicinity of the metallic piece thus producing very high electric fields. For example, these fields may be on the order of $10^6$ volts/cm. This effect is commonly called the "point effect."

SUMMARY OF THE INVENTION

This invention is intended to create structures in an electrical discharge tube of a gas laser generator for obtaining homogeneous discharges, without electric arc, with considerable active volumes and with high repetition rates through the application of relatively low electrical voltages.

This invention concerns a discharge tube for gas laser generators which include an anode and a cathode characterized by the fact that at least one portion of the cathode has at least one protuberance which has a sharp end, at least one auxiliary electrical conductor, associated with said cathode and arranged in the proximity of said sharp end and separated therefrom by a solid insulating material.

BRIEF DESCRIPTION OF THE DRAWINGS

Other features and advantages of this invention will appear in the course of the detailed description below while referring to the attached drawings given here by way of illustration of which.

DETAILED DESCRIPTION OF THE PREFERRED EMBODIMENTS

Figure 1:
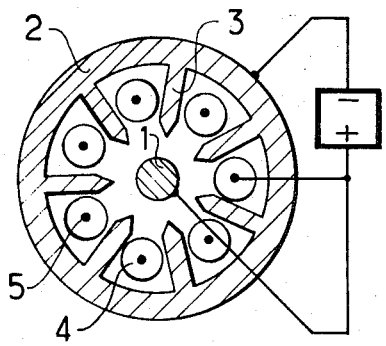
FIGS. 1 and 2 represent, respectively, a cross section of two variants of a coaxial discharge tube with multiple axial plates, FIGS. 3 and 4, respectively, represent a cross section of two variants of a coaxial discharge tube with single helicoidal plate.

FIG. 1 represents a cross section of a discharge tube constructed in accordance with one embodiment of this invention. The discharge device has a coaxial structure and includes a central conductor 1 which is coupled to a positive potential and an exterior conductor 2 which is coupled to negative potential. The exterior conductor has, on its inside surface, a series of thin plates 3, preferably as fine as possible, arranged axially and directed toward the central conductor 1.

These thin plates, which for example, can be steel plates, such as razor blades or the like, have an edge that should be as sharp as possible so as to obtain as sharp a point as possible.

According to one embodiment of the invention, auxiliary electrical conductors 5 are arranged in the space bounded by two consecutive plates. Conductor 5 is separated from the lateral surface of the plates 3 and from the inside surface of the conductor 2 by the solid insulating material 4. This insulating material may enclose the conductor 5 before it is put in place between plates 3 or, it may be poured directly into the space between the plates. This insulating material 4 must of course have suitable characteristics to prevent its destruction due to heat, the decomposition products of the gases, contained in the discharge device, etc.

Electrical conductors, such as 5, are brought to a potential higher than the conductor 2–3. This may be done by electrically connecting conductor 5 with conductor 1.

Conductor 5 is preferably placed as close as possible to the edges of the two consecutive plates. As we explained earlier, "the point effect" produces the tearing-away of electrons, starting the discharge between the negative electrodes (2–3) and the positive electrode 1. The distribution of plates 3 creates a very homogeneous discharge, while the fineness of the edges of these plates makes it possible to make a discharge in a gas under a relatively high pressure, with a relatively low voltage. The addition of conductors 5, which have a positive potential with respect to the cathode, acts as an auxiliary electrode, promoting the creation of electrons while improving the homogeneity of the discharge. The effect of conductors 5 is especially beneficial when arranged close to the active portion (edge) of plates 3.

Figure 2:
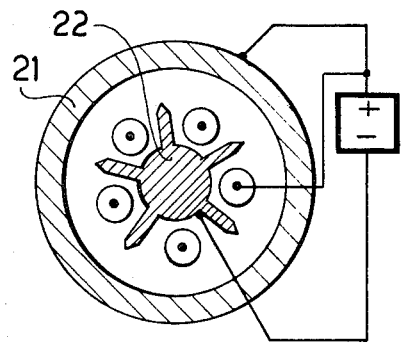

FIG. 2 shows a cross section of another possible way of implementing the invention. This second device is distinguished from the earlier one only by the fact that the plates and the auxiliary conductors are arranged on the surface of the interior conductor 22 of the coaxial structure 21, 22.

Figure 3:
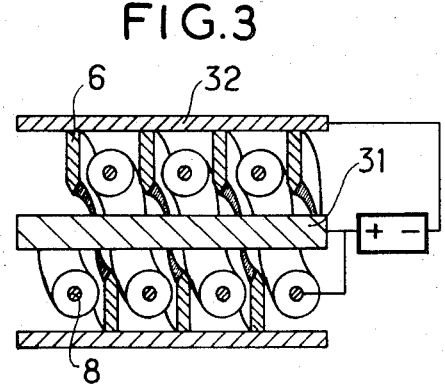

FIG. 3 shows an axial cross section of a variant of the device according to FIG. 1. According to this embodiment, instead of using a plurality of plates arranged axially, we employ a single helicoidal plate 6, attached to the inside surface of the outside conductor 32 of the coaxial structure (31, 32).

Figure 4:
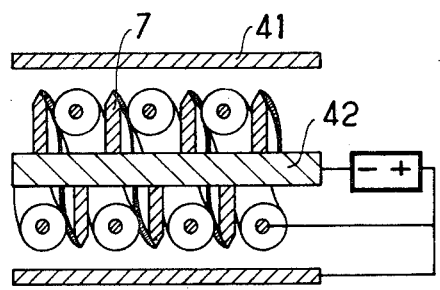

In FIG. 4 the plurality of axial plates shown in FIG. 3 is replaced by a single helicoidal plate 7, attached to central conductor 42 of the coaxial structure 41, 42. Of course, in the case of FIGS. 3 and 4, the insulated auxiliary conductor 8 is formed from a single helicoidally arranged conductor.

Figure 5:
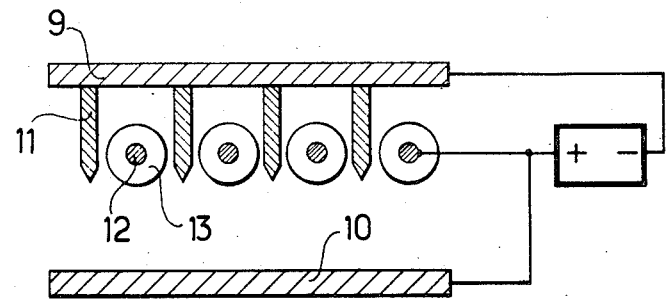
FIG. 5 represents, in a cross section, a first variant of a discharge device with electrodes forming a flat assembly and involving flat straight and normal plates.

FIG. 5 shows another embodiment of the invention. In FIG. 5, electrodes 9 and 10 are planar, the sharp-edged plates 11 are arranged parallel on the cathode 9, and auxiliary conductors 12 include an insulation 13 arranged essentially co-planar with the edges of plates 11.

Figure 6:
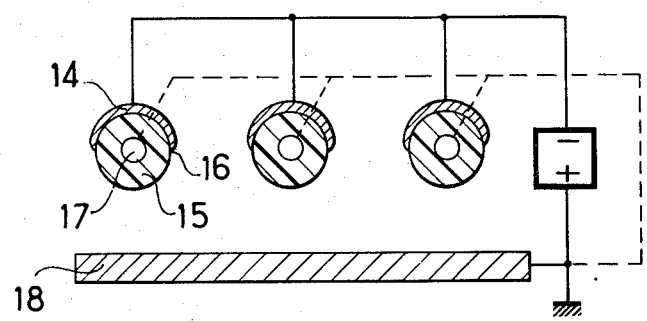
FIG. 6 represents, in cross section, a second variant of a discharge device with electrodes forming an essentially plane assembly.

FIG. 6 shows a cross section of another embodiment of the invention wherein the negative electrode (cathode) consists of a plurality of semicylindrical metallic surfaces 14 obtained by depositing a metal layer on rods 15 made of insulating material and advantageously having a cylindrical or semicylindrical cross section or, more generally, a rounded form.

Surfaces 14 can be deposited, for example, with a brush by any other suitable means and their edges must also be as fine as possible in order to make up a sharp edge 16 which will produce a large "point effect."

Rod 15 is advantageously made of insulating material and will serve as an insulating envelope for conductor 17 which is given a positive potential with respect to the cathode. This may be done, for example, by connecting conductor 17 to the anode 18. This metallic conductor plays the same role as conductors 5, 8 and 12 in the preceding figures.

Figure 7:
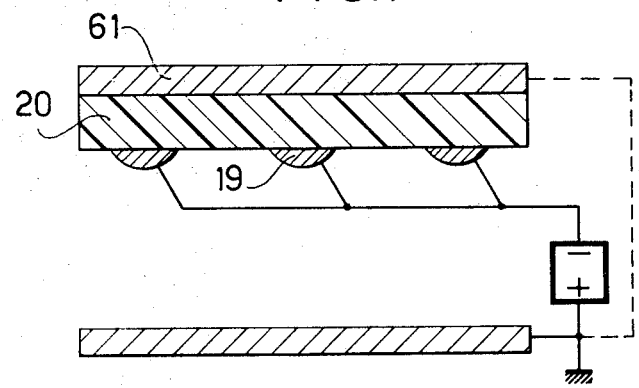
FIG. 7 represents a cross section of a third variant with electrodes.

FIG. 7 shows a cross section of another embodiment wherein the negative electrode of the cell consists of deposited metallic surfaces 19, arranged on a flat insulating support 20. Associated with this support is a metallic conductor 61 which, although placed behind surfaces 19, is connected in the same fashion as the conductors 5, 8, 12 and 17 in the preceding figures and which plays the same role as these conductors. Conductors 61 may be massive or may be a fine layer of metal.

It is of course understood that surfaces 14 and 19 can be made either from a pure metal or an alloy and can be made from a metallized paint, the deposit being made here in any known manner so as to obtain sharp edges.

Figure 8:
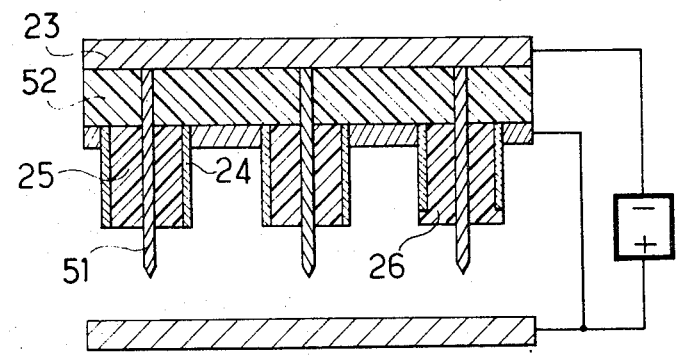
FIG. 8 represents another variant with electrodes forming a plane assembly in which the protuberances come in the form of transversal rods.

FIG. 8 is a cross section of a device which is a variation of that illustrated in FIG. 5. In FIG. 8, we fragment the plates by using separate rods with sharpened ends. According to this variant, rods 51, kept in place by an insulating piece 52, are connected to the negative terminal of a high-voltage source, either by individual conductors or by means of a metallic plate 23.

In FIG. 8, the auxiliary conductors play a role similar to the conductors 5, 8, 17 and 61 in the preceding figures and are made in the form of a cylinder 24 surrounding each of the rods 51 with the interposition of an insulating agent 25.

To avoid untimely discharge between rod 51 and conductor 24, the latter's end will preferably be covered with an insulating agent as illustrated by portion 26, shown on the element situated to the right in FIG. 8.

Of course, each laser discharge tube is arranged in a resonant cavity, made up of at least two reflecting mirrors, so that the optical axis of this cavity will be either essentially parallel to the anode and essentially at an equal distance between this plane and the plane defined by the ends of the points of the cavity for the plane discharge tubes and will merge with the axis of the central electrode for the tubes with coaxial structure.

What is claimed is:

1. In a gas laser generator including a discharge tube having an anode and a cathode, the improvement comprising:
   a. said cathode including at least one plate, having a sharp beveled edge, and
   b. at least one auxiliary electrical conductor arranged adjacent said sharp edge of said plate, whereby said sharp edged plate and said auxiliary conductor aids in the creation of a discharge between said cathode and said anode.

2. The discharge tube of claim 1 further including insulation means separating said auxiliary conductor from said cathode and means for causing said auxiliary conductor to obtain an electric potential positive with respect to said cathode.

3. The discharge tube of claim 2 wherein said cathode is cylindrical and comprises a plurality of said sharp edge plates spaced along the circumference thereof and a plurality of said auxiliary conductors, one spaced between each successive pair of plates.

4. The discharge tube of claim 3 wherein said sharp edged plates are spaced along the inside circumference of said cathode.

5. The discharge tube of claim 3 wherein said sharp edged plates are spaced along the outside circumference of said cathode.

6. The discharge tube of claim 3 wherein said cathode and anode form a coaxial structure.

7. The discharge tube of claim 2 wherein said cathod and anode are each of a planar structure, said sharp edge of said plate being arranged essentially normal to one planar surface of said cathode.

8. The discharge tube of claim 7 further comprising a plurality of said plates and said auxiliary conductors, each of said auxiliary conductors being spaced between a pair of said plates.

9. The discharge tube of claim 1 wherein said cathode and anode form a coaxial structure said plate are formed by the edge of a single helicoidal plate arranged on the surface of said cathode.

10. The discharge tube of claim 9 wherein said auxiliary conductor is a helical.

11. The discharge tube of claim 1 wherein said auxiliary conductors and said plates are plural in number and wherein said auxiliary conductors are arranged essentially coplanar with said sharp edges of said plates.

12. The discharge tube of claim 2 wherein said auxiliary conductor is cylindrical and said insulating means includes a solid insulating material disposed around said auxiliary conductor.

13. The discharge tube of claim 1 wherein said auxiliary conductor is tubular and surrounds said plate.

14. The discharge tube of claim 2 wherein said insulation means includes a solid insulating material and said cathode is a metallic deposit formed on said insulating material which terminates in a sharp tapered edge.

15. The discharge tube of claim 14 wherein said solid insulating material is a tube with an essentially cylindrical cross section.

16. The discharge tube of claim 15 wherein said auxiliary conductor is embedded in said tube shaped insulating material.

17. The discharge tube of claim 14 wherein said insulating material is essentially planar in structure.

18. The discharge tube of claim 17 wherein said auxiliary conductor is a metallic deposit on said planar insulating material on the face opposite the one on which is deposited said cathode.

* * * * *